(12) United States Patent
Sabó

(10) Patent No.: US 6,398,265 B1
(45) Date of Patent: Jun. 4, 2002

(54) FLUIDS CONDUCTION INTEGRATED SYSTEM

(75) Inventor: Alfredo Miguel Sabó, Sao Paulo (BR)

(73) Assignee: Sabo Industrio E Commercia Ltda, Sao-Paulo (BR)

( * ) Notice: Subject to any disclaimer, the term of this patent is extended or adjusted under 35 U.S.C. 154(b) by 0 days.

(21) Appl. No.: 09/650,537

(22) Filed: Aug. 30, 2000

(51) Int. Cl.[7] .................................................. F16L 33/02
(52) U.S. Cl. .......................................... 285/23; 285/252
(58) Field of Search ........................... 285/23, 252, 253

(56) References Cited

U.S. PATENT DOCUMENTS

| | | | | |
|---|---|---|---|---|
| 3,365,218 A | * | 1/1968 | Denyes | 285/253 |
| 3,407,449 A | * | 10/1968 | Tetzlaff et al. | 285/253 |
| 5,002,094 A | * | 3/1991 | Brovont | 285/252 |
| 5,185,913 A | * | 2/1993 | Campo et al. | 285/253 |
| 5,388,321 A | * | 2/1995 | Farrell | 285/23 |
| 5,456,784 A | * | 10/1995 | Cogdill et al. | 285/253 |
| RE35,253 E | * | 5/1996 | Worley et al. | 285/23 |

* cited by examiner

Primary Examiner—Eric K. Nicholson
(74) Attorney, Agent, or Firm—Sidley Austin Brown & Wood, LLP

(57) ABSTRACT

A fluid conduction integrated system including an elastomeric hose for conducting fluids, an open clamp (10) for fixing the hose in a place of use, and a band-shaped fixation element (20) arranged in a region of the cooperating fixation portions of the hose (1) and the clamp (10), with the hose (1), the clamp (10), and the fixation element (20) being connected with each other by vulcanization.

3 Claims, 3 Drawing Sheets

FLUIDS CONDUCTION INTEGRATED SYSTEM

BACKGROUND OF THE INVENTION

1. Field of the Invention

The present invention relates fluids conduction integrated system, particularly in the filed of autoparts, which has been improved in order to provide a better use and performance than the conventional fluid conduction integrated systems.

2. Background of the Invention

As it is well known, the engine, brake, air caption and other cooling systems of automotive vehicles include, among other components, hose conducts intended for the circulation of the cooling liquid, brake fluid, air and others. These hoses conduits essentially comprise the hoses themselves, through which the fluids run and the clamps intended for holding the hoses in the places where they are used.

In a more traditional solution, the hoses and clamps are supplied separately to the final users, i.e., the OEMs and/or autoparts manufacturers or others. Such a way of supplying causes several problems for the final users, as the need for management procedures, such as purchase, quality control, stock, stock control and others, related to the hose and its clamps need be.

Such way of supplying the so conduits also shows problems in the assembly line of the vehicles and/or of their sub-systems that use hoses. Once it required the clamp to be assembled in the hose, the assembly of that set thakes place in the place of use and procedures for appropriate positioning and clamp tightening. Whereas a vehicle and/or some of its sub-systems may contain a great number of hose conduits and these are often in places with difficult access. This could mean undesirable time increase, a greater difficulty, a great probability of failures and other inconveniences in the assembly line.

Another problem arising from the supplying of hoses and clamps disconnected one from another was related to the repair or maintenance made in workshops, since said shops sometimes did not have all the necessary means for a technically appropriate work and, as a result, faulty assemblies occurred, which caused problems to the vehicle and/or it sub-systems.

In view of all such facts, more recently the hoses and their respective clamps started to be supplied to the final users as integrated systems composed of the hoses themselves and their respective clamps already assembled, positioned and properly attached to one another, at the hoses plant. That is advantageous to the final users once, instead of several items, a single item, hose and pre-assembled clamp(s), is subject to management procedures in the assembly line. Another advantage obtained form such integrated systems concerns facilities and time saving, once the assembling and positioning of the hose and the clamp(s) is not necessary in the vehicle and/or it sub-systems assembly. Yet, such way of supplying the hoses, already containing the clamp(s), has advantages in the repair and maintenance services, once it facilitates a technically appropriate assembly; even in workshops lacking all the necessary means.

In a more usual way to obtain those integrated systems, the pre-open hose and clamp(s) are pre-assembled and pre-attached to each other by glueing. However, the glueing has not been showing to be resistant enough to the stresses to which the hose and clamp(s) integrated systems may be subject along the stock and/or transportation and/or assembly procedures in the place of use and the glue often cracks, causing the clamp(s) to detach from the hose. That causes the loss of all the advantages potentially offered by such hose and clamp(s) integrated systems, and demands from the hoses manufacturers the so called "rework", i.e., the reassembly, repositioning and reattachment of the hose and clamp(s) made by the final user of the product, OEMs and/or autoparts manufacturers and/or others.

Thus, the object of the present patent of invention is to provide an improved fluid conduction integrated system, which overcomes the problems observed with the similar conventional systems.

SUMMARY OF THE INVENTION

The construction, working and advantages of the invention will be described below, with reference to the accompanying drawings, in which.

DETAILED DESCRIPTION OF THE PREFERRED EMBODIMENT

Figure 1:
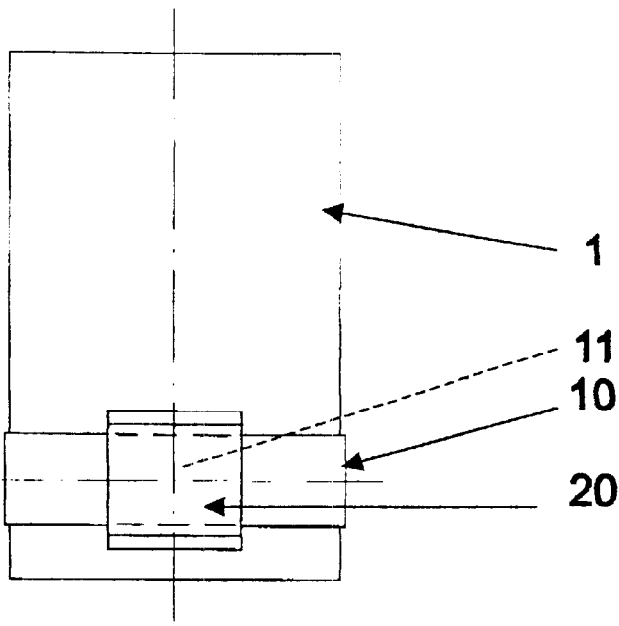
FIG. 1 is a side view showing a portion of a hose according to the present invention, in which the area of incorporation of the clamp to the hose is in plan view.

In agreement with what the above listed figures show, the fluid conduction integrated system, object of the present patent of invention applies particularly, but not limited, to the automotive industry and essentially comprises: a hose made of elastomeric material 1, through which the fluid to be conducted runs; and originally open clamp(s) 10 for fixing the hose in the place of use, which hose and clamp(s) are assembled, positioned and incorporated to each other at the hoses plant, in such a way that the final user receives an integrated set of hose 1 and open clamp(s) 10 ready to be assembled directly in the place of use, without requiring pre-assemblies and pre-positioning of its parts.

The improvement, object of the present patent, consist substantially of the incorporation of hose 1 and its respective originally open clamp(s) 10 by vulcanization.

In a possible accomplishment, a fixation portion of the outer surface of hose 1, a fixation portion 11 of the open clamp 10, preferably substantially opposite to the tightening device 12 and an elastomeric fixation portion of the outer surface of hose 1, fixation portion 11 of the clamp and elastomeric fixation element 20 are shaped and arranged in such a way that, after the vulcanization, the hose and the clamp are integrated to each other.

Therefore, the present system is received by the final user completely assembled and having the clamps open, and its assembly in the place of use is made simply by coupling the hose ends to its inlets and tightening the clamps until the set is properly fixed.

This way of constructing the fluid conduction integrated system eliminates the inconvenience of the conventional system, where the incorporation of parts is made by glueing, as aforesaid, while the construction herein provides an integration between the parts, which is able to support all the demands to which the system is subject, either during the transportation, stock, assembly or use.

Thus, the construction of the present fluids conduction integrated system ensures that the typical advantages of that system are maintained, i.e., assembly, positioning and fixation of the hose and the open clamp(s) made at hoses plant, in such a way that the final user is able to assemble the system directly in the place of use, without the need for pre-assemblies and pre-positioning of the parts thereof.

Within the basic conception above described, it is claimed that the improved system, object of the present patent of invention, be able to show changes related to materials, dimensions and constructive details without digressing the scope of the protection requested.

Figure 2:
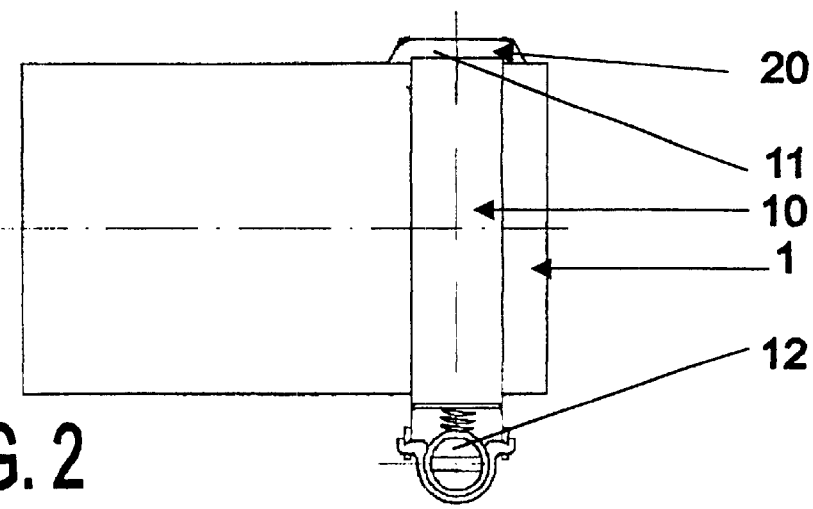
FIG. 2 is a side view at ninety degrees in relation to the previous one.
Figure 3:
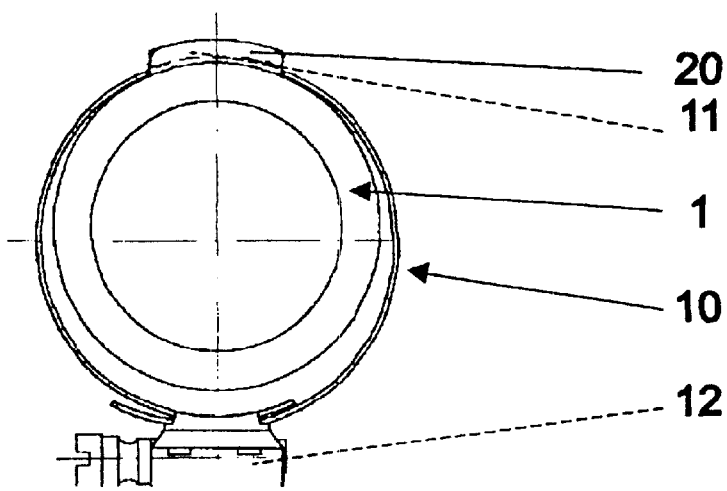
FIG. 3 is a top view of the portion of the hose in the previous views.

Thereafter, (FIGS. 1 to 3), the fixation portion 11 of the open clamp 10 is inserted between a fixation portion of the outer surface of the hose and a band-shaped elastomeric fixation element 20, which is overlapped on said fixation portion 11 of the clamp and the opposite edges are laid and overlapped on the fixation portions of the outer surface of the hose, which are adjacent to said fixation portion 11 of the clamp; said fixation portions of the outer surface of hose 1, fixation portion 11 of the clamp and elastomeric fixation band 20 so arranged are incorporated to one another by vulcanization.

Figure 4:
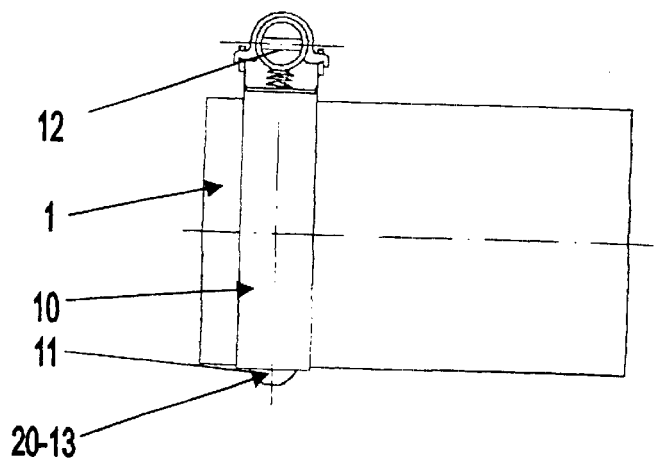
FIG. 4 to 6 show another embodiment of the system.
Figure 5:
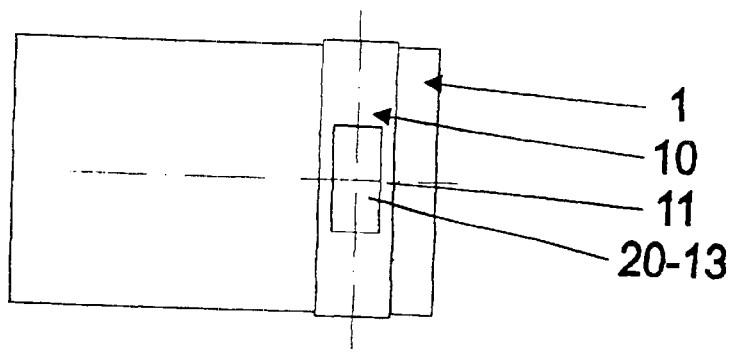
Figure 6:
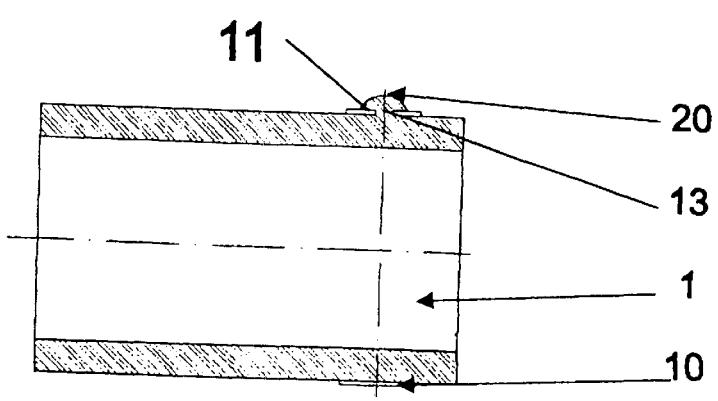

In another arrangement, the fixation portion 11 of the clamp can be provided with elements 13, which facilitate the mechanical anchoring between the parts. Such mechanical anchoring elements 13 can consist of through bore(s) (FIGS. 4 to 6) made on said portion 11 and/or profile(s) of the edges and/or surface of said portion 11, defined by lowered and intercalated projected portions (not shown) and/or others.

When the mechanical anchoring element 13 is(are) a bore(s) made in the fixation portion 11 of the clamp, the elastomeric fixation element 20 may be composed of an elastomeric pin(s), inserted in the bore(s), one end of which incorporates to the body of hose 1 and the opposite end incorporates a widened elastomeric portion, as for example, an elastomeric plate, which widened portion is wider than the bore(s) and not necessarily extending beyond the clamp edges (FIGS. 4 to 6), thus promoting an integration by vulcanization and mechanical means between the hose and the clamp.

Hose 1 is elastomeric and may be of any type among the normally used ones, such as the simple-walled or provided with a reinforcement, composed of only one body of hose with any appropriate embodiments or composed b one body with derivation(s) or other.

Figure 7:
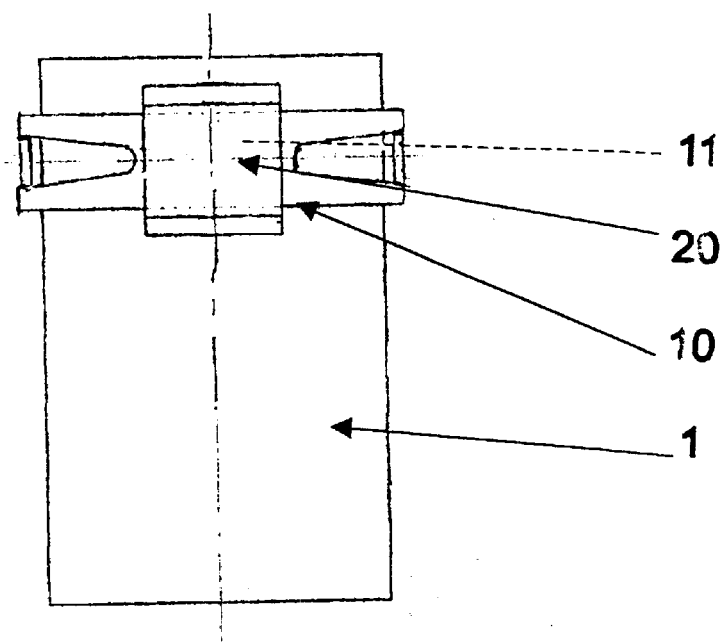
FIG. 7 and 8 show yet another embodiment of the system.
Figure 8:
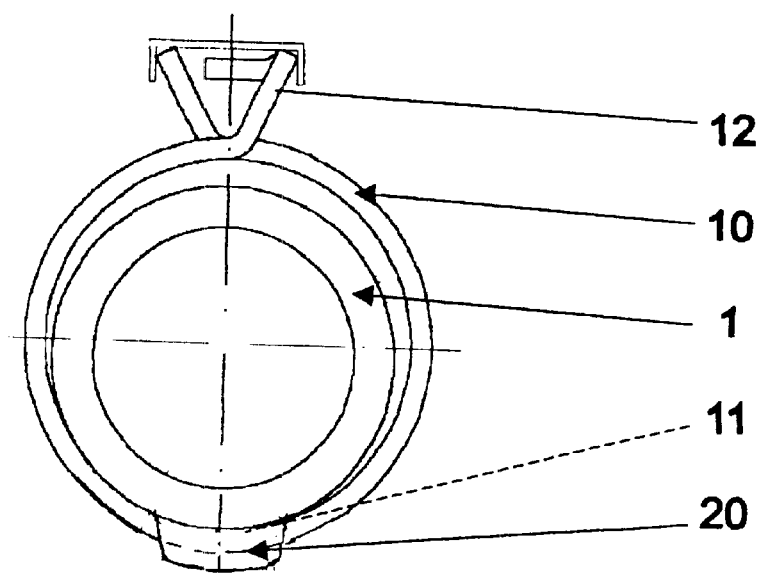

Clamp 10 can be of any type among the normally used one, such as the ones of screw and rack type (FIGS. 1 to 6) or of the spring type (FIGS. 7, 8) or any other appropriate ones, obtained from material appropriate to support the demands to which the clamp is subject and to the vulcanization process, preferably metal.

The system can have any diameters, according to the purpose it is intended to.

The system can be applied to the automotive industry in several sub-systems of automotive vehicles that use hoses circuits or in any other use that needs the conduction of any fluids.

What is claimed is:

1. A fluid conduction integrated system, comprising an elastomeric hose for conducting fluid; an open clamp (10) for fixing the hose in a place of use and having a fixation portion (11) located substantially opposite means (12) for tightening the clamp (10) on the hose (12) and cooperating with a fixation portion on an outer surface of the hose (1); and a band-shaped fixation element (20) arranged in a region of the cooperating fixation portions of the hose (1) and the clamp (10), overlapping the fixation portion (11) of the clamp, with opposite circumferential edge regions of the fixation element (20) overlapping surface portions of the outer surface of the hose (1) adjacent to circumferential edges of the clamp (10), wherein the fixation portion (11) of the clamp includes means (13) for mechanically anchoring of the clamp (10) with the fixation element (20), and wherein the hose (1), the clamp (10), and the fixation element (20) are connected with each other by vulcanization.

2. A fluid conduction integrated system according to claim 1, wherein the mechanical anchoring means (13) comprises a bore formed in the clamp fixation portion (11), and the fixation element (20) comprises pin means extending into the bore formed in the clamp fixation portion.

3. A fluid conduction integrated system according to claim 1, wherein the mechanical anchoring means comprises a projection provided on the fixation portion of the clamp and extending into the fixation element.

* * * * *